United States Patent [19]

Maher et al.

[11] Patent Number: 5,381,403

[45] Date of Patent: Jan. 10, 1995

[54] METHOD FOR ESTABLISHING AND MAINTAINING SYSTEM CONFIGURATION INFORMATION

[75] Inventors: John W. Maher, Woodstock; Arms Yongyuth, Chicago, both of Ill.

[73] Assignee: Motorola, Inc., Schaumburg, Ill.

[21] Appl. No.: 42,224

[22] Filed: Apr. 2, 1993

[51] Int. Cl.⁶ .................... H04J 3/14; H04L 12/52; G06F 11/00
[52] U.S. Cl. ................................. 370/13; 370/58.2; 370/85.13; 370/94.3; 370/95.1; 370/110.1; 379/59; 379/63; 455/33.1; 455/53.1; 340/825.17; 371/11.1
[58] Field of Search ............... 370/16, 54, 58.1-58.3, 370/77, 79, 80, 85.1, 85.7, 85.8, 85.13, 94.1, 95.1, 95.2, 110.1, 112, 94.3; 340/825.03, 825.06, 825.08, 825.15, 825.22, 825.54, 825.16, 825.17, 825.52; 379/58, 59, 61, 63; 455/33.1, 34.1, 69.1, 53.1, 54.1, 54.2, 56.1; 371/8.1, 10.1, 11.1, 11.3, 12, 13

[56] References Cited

U.S. PATENT DOCUMENTS

| | | | |
|---|---|---|---|
| 4,630,263 | 12/1986 | Townsend et al. | 370/85.8 |
| 5,101,502 | 3/1992 | Felderman et al. | 455/34.1 |
| 5,123,110 | 6/1992 | Grube | 455/33.1 |
| 5,175,727 | 12/1992 | Maher et al. | 370/58.1 |
| 5,197,065 | 3/1993 | Calvignac et al. | 370/79 |
| 5,210,746 | 5/1993 | Maher et al. | 370/79 |
| 5,274,630 | 12/1993 | Jestice et al. | 370/58.1 |

*Primary Examiner*—Alpus H. Hsu
*Attorney, Agent, or Firm*—Timothy W. Markison

[57] ABSTRACT

In a communication system network that includes a central controller that is operably coupled to a processing multiplexer switch, system configuration information may be transferred between the central controller and the processing multiplexer by establishing a communication link between the central controller and the processing multiplexer switch. Once the link is established, the central controller requests site interface configuration information from the processing multiplexer. The site interface information indicates the status of the interfaces and the type of site coupled to the interface. Once this has been relayed to the central controller, the central controller determines the particular type of site coupled to the site interface. If the site is of a first site type, the central controller assigns the link between the site and the site interface a unique link address. If, however, the site is of a second site type, the site informs the central controller of the unique link address and also the system features that are available at that site.

12 Claims, 4 Drawing Sheets

5,381,403

METHOD FOR ESTABLISHING AND MAINTAINING SYSTEM CONFIGURATION INFORMATION

TECHNICAL FIELD OF THE INVENTION

This invention relates generally to communication systems and, in particular, to establishment and maintenance of system configuration information.

BACKGROUND OF THE INVENTION

Communication systems are known to comprise a plurality of communication units arranged into communication groups, a limited number of communication resources, and a communication resource allocator. The communication resource allocator allocates the communication resources, as voice channels, to particular communication groups upon a request from one of the communication units in the group. The communication unit makes the group call request by transmitting a group call request to the communication resource allocator via a control channel, wherein the control channel is one of the limited number of communication resources which transceives communication system information between the plurality of communication units and the communication resource allocator. (Note that a communication resource may be a carrier frequency, a pair of carrier frequencies, a time division multiplex (TDM) slot, or any other RF medium.) When a voice channel is allocated to the particular communication group, every member of the group may participate in the communication via the allocated voice channel. When the group call ends for the particular group, the voice channel is de-allocated such that it may be allocated to another communication group.

In recent years, technological advances have allowed several communication systems to be linked together via a central controller to form a communication system network. In the communication system network, the central controller allocates the communication resources in each communication system (or communication site) to the communication groups. Thus, a communication group call may be established in several communication systems such that the members of the communication group may be located in any one of the communication systems and still participate in the group call. For example, if the communication system network comprises four communication systems, wherein a member of a particular talk group is located in each communication system, a communication resource will be allocated in each system to the group. The central controller will then link the allocated communication resources together such that the group call may occur throughout the communication system network.

Even more recently, technological advances now allow, during a communication group call, multiple communication units to talk at one time and have their audio summed together by a processing multiplexer switch. The processing multiplexer switch is fully described in U.S. Pat. No. 5,175,727, assigned to Motorola. However, the use of the processing multiplexer switch with the communication system network requires system configuration information to be transferred between the central controller of the communication system network and the processing multiplexer switch. The central controller needs this information to establish communication group calls. Therefore, a need exists for a method that allows system configuration information to be transferred between the central controller of the communication system network and the processing multiplexer switch and subsequently stored.

BRIEF DESCRIPTION OF THE DRAWINGS

FIGS. 2-1, 2—2, and 2-3 illustrate a logic diagram that may be used to implement the present invention.

DETAILED DESCRIPTION OF A PREFERRED EMBODIMENT

Generally, the present invention provides a method that allows a central controller of a multi-site communication system to establish and maintain a database of system configuration information. This is accomplished by establishing a communication link between the central controller and a processing multiplexer switch. Once the link is established, the central controller assigns the link a link address which is stored as part of the system configuration information. Next, the central controller queries the processing multiplexer switch for additional system configuration information which includes: the number of active site interfaces of the processing multiplexer switch, the number of active sites coupled to the site interfaces, the type of these sites, and link addresses of the links that couple the active sites to the site interfaces. Upon receiving this information, the central controller stores it in the database and continually updates the database whenever a change occurs in the system configuration information.

Figure 1:
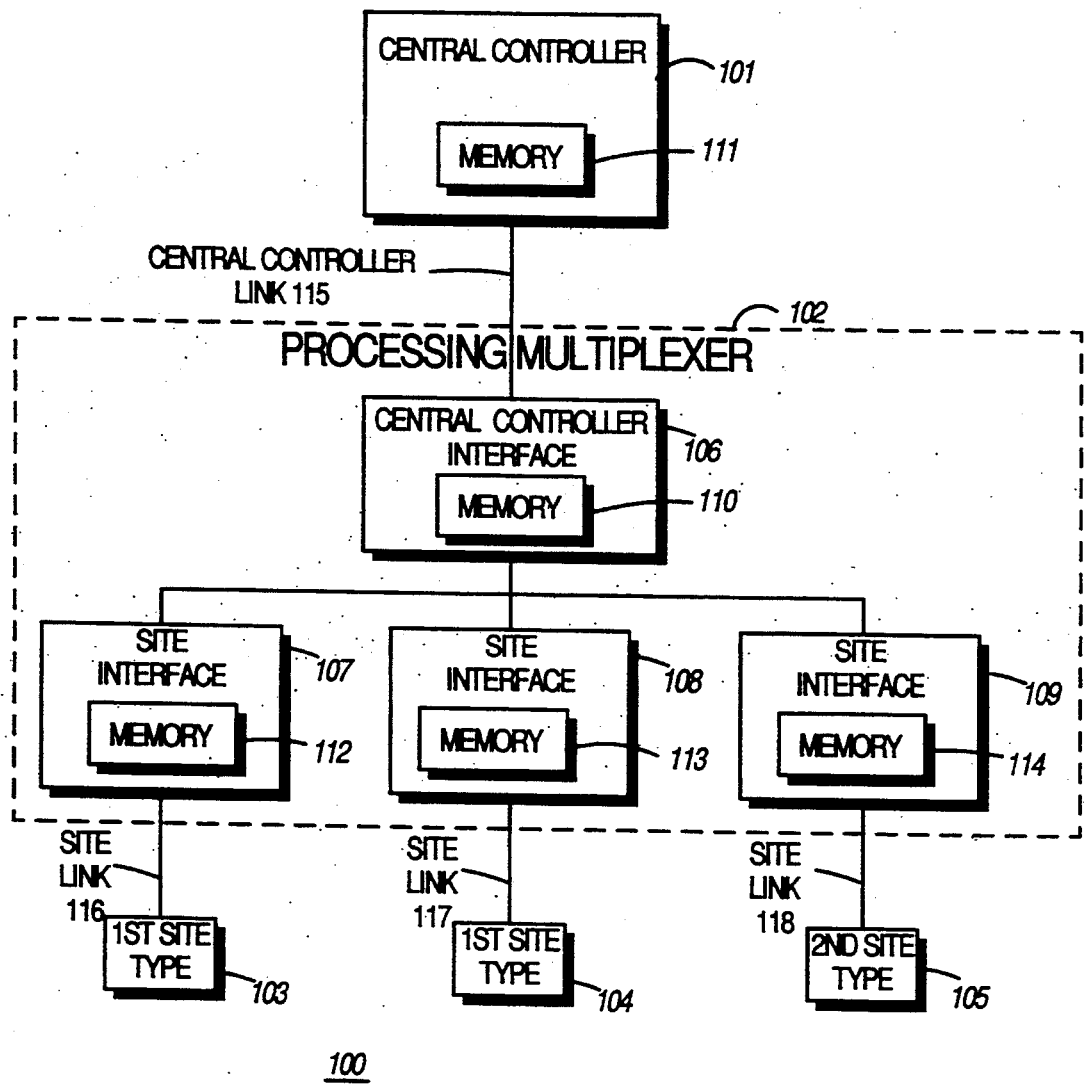
FIG. 1 illustrates a communication system network coupled to a processing multiplexer switch in accordance with the present invention.

The present invention can be more fully described with reference to FIGS. 1 and 2. FIG. 1 illustrates a multi-site communications system (100) that comprises a central controller (101), a processing multiplexer switch (102), and a plurality of sites (103–105). The processing multiplexer (102) comprises a plurality of site interfaces (107–109) and a central controller interface (106). The central controller (101) is connected to the central controller interface (106) via a central controller communication link (115), while the sites (103–105) are connected to the site interfaces (107–109) via site communication links (116–118). The central controller (101), the central controller interface (106) and the site interfaces (107–109) each comprise memory (110–114).

The site interfaces (107–109) and the memory therein (112–114) of the processing multiplexer (102) are described in U.S. Pat. No. 5,175,727, entitled A Communications System Network, and assigned to Motorola Inc., which is incorporated herein. In the '727 patent, the site interfaces are referred to as ambassador boards and the memory (112-114), as system configuration databases. The '727 does not describe the central controller interface (110) which may be a Zone Controller/Ambassador Interface Module manufactured by Motorola, Inc.

The central controller interface (106) provides a data communication path between the central controller (101) and the processing multiplexer (102) to route system configuration information from the site interfaces (107–109) to the central controller (101), such that the central controller (101) may store this information in memory (111). In addition, the central controller interface (106) processes requests from the central controller (101) for the system configuration information and forwards any changes in the system configuration information to the central controller (101).

The central controller (101) and the general operation of a multi-site communication system (100) are described in U.S. Pat. No. 5,123,110, entitled Smart-Zone Critical Sites/Users and U.S. Pat. No. 5,101,502, entitled Busy Override. Both patents are assigned to Motorola Inc. and incorporated herein.

The communication links (115–118) may be of any type link that accommodates the bit rate of the communication system network. For example, the central controller communication link (115) may be a Link Access Procedure—Balanced (LAPB) protocol to ensure packet error recovery via a sliding window protocol and the site communication links (115–118) may comprise multiple 64Kbit channels. In North America this might be a T1 line consisting of 24 such channels, whereas in European countries 32 channels are incorporated and referred to as an E1 format. A channel may be used to send a 64Kbit Pulse Code Modulation (PCM) a-law or $\mu$-law encoded digital audio sample, or 64Kbit signaling information of a LAPB protocol.

The sites (103–105) may be either a first site type, such as the sites designated (103–104), or a second site type, such as the site designated (105). A first site type (103–104) may consist of a channel bank like that manufactured by Siemens, wherein individual channels from a T1 communication link are converted from 64Kbit PCM to analog voice and vice versa. A second site type (105) may consist of a Central Electronics Bank (CEB) as described in U.S. Pat. No. 4,630,263 entitled Time-Division Multiplex Communications Control System, assigned to Motorola, Inc. The CEB comprises individual modules such as transmit/receive (T/R) modules and Operator Interface Modules. The T/R modules transform the 64Kbit PCM digital audio into analog audio and vice versa. The Operator Interface Module, which is coupled to an operator station, accepts microphone audio and translates it into 64Kbit PCM which is dispatched to various destinations via the processing multiplexer (102).

Figures 1, 2:
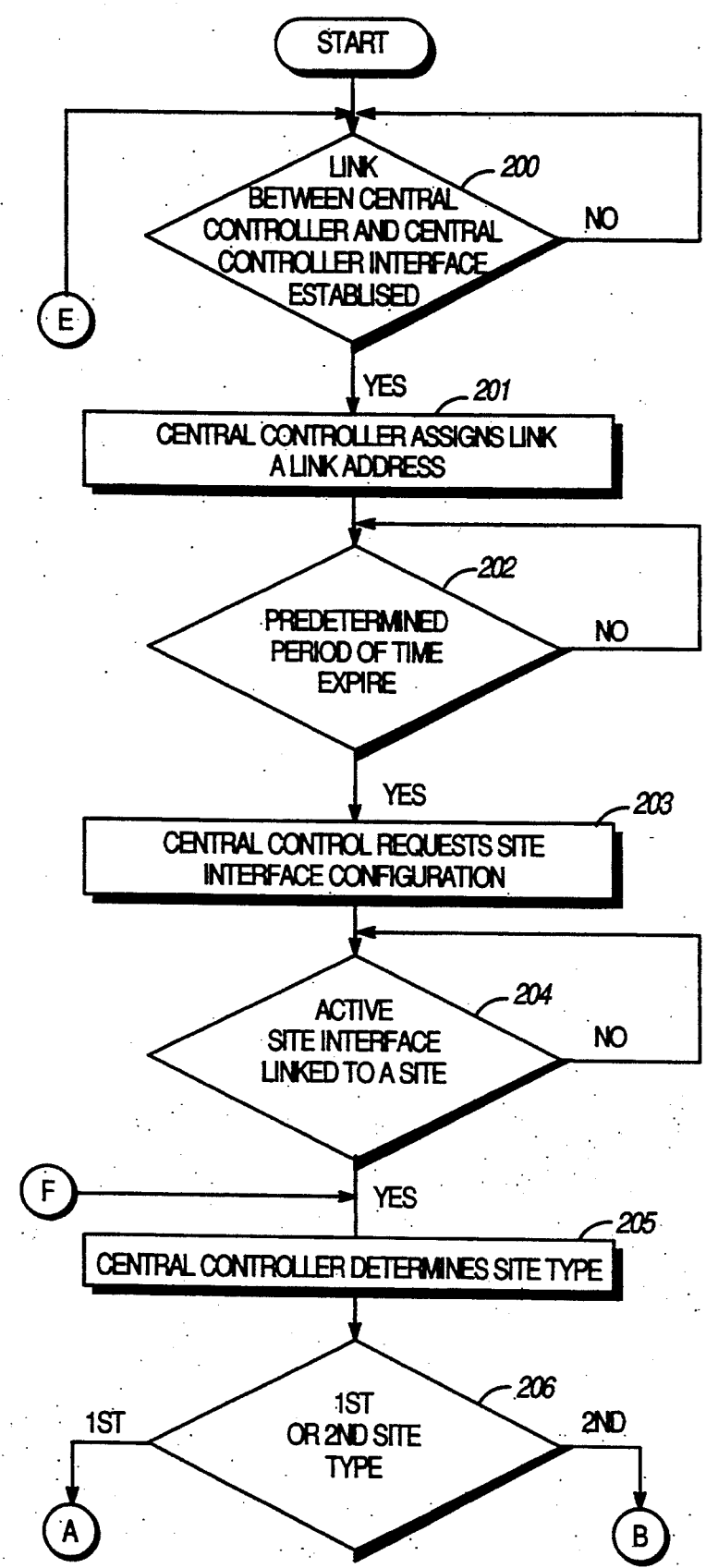
Figure 2:
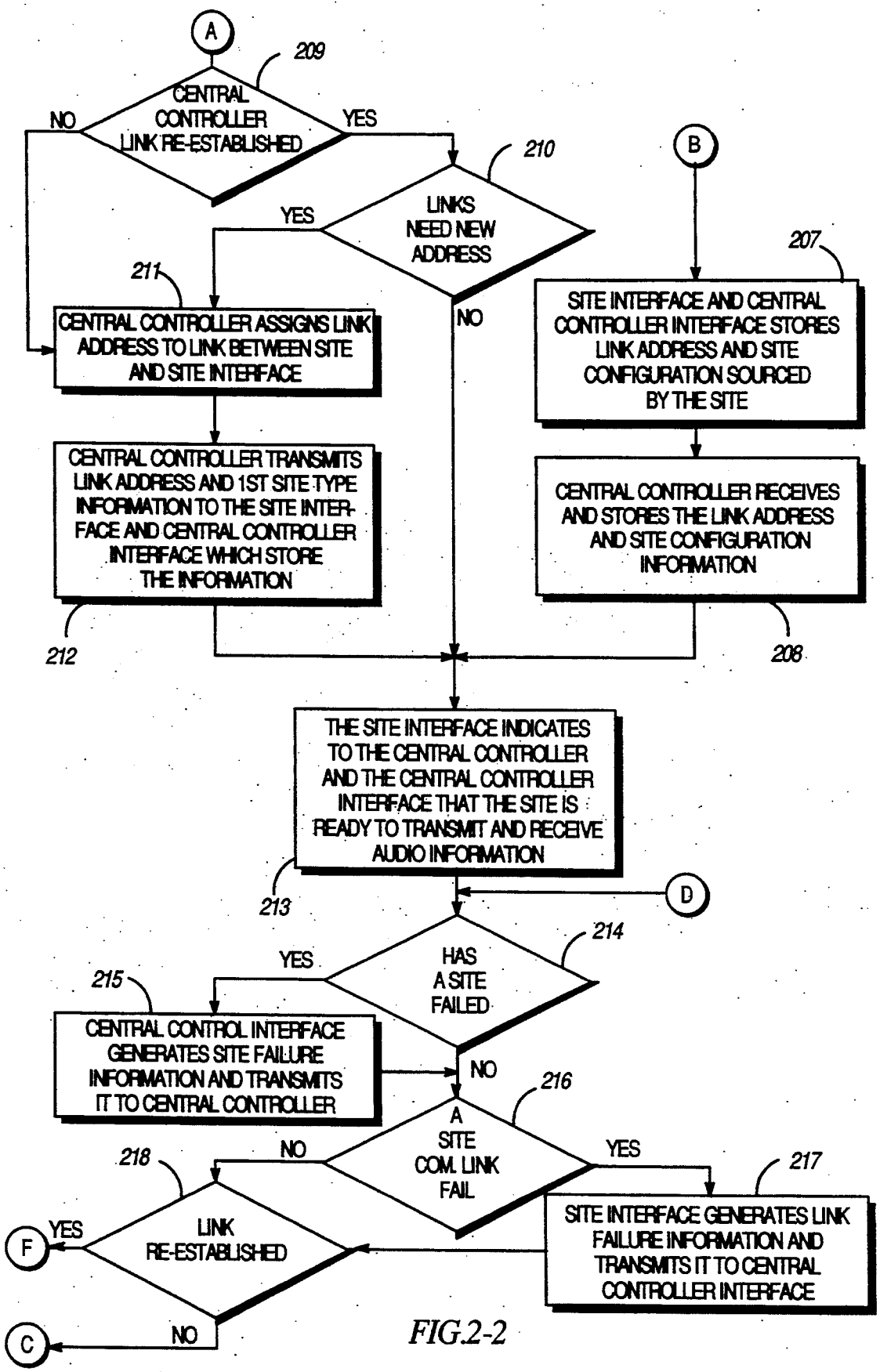
Figures 2, 3:
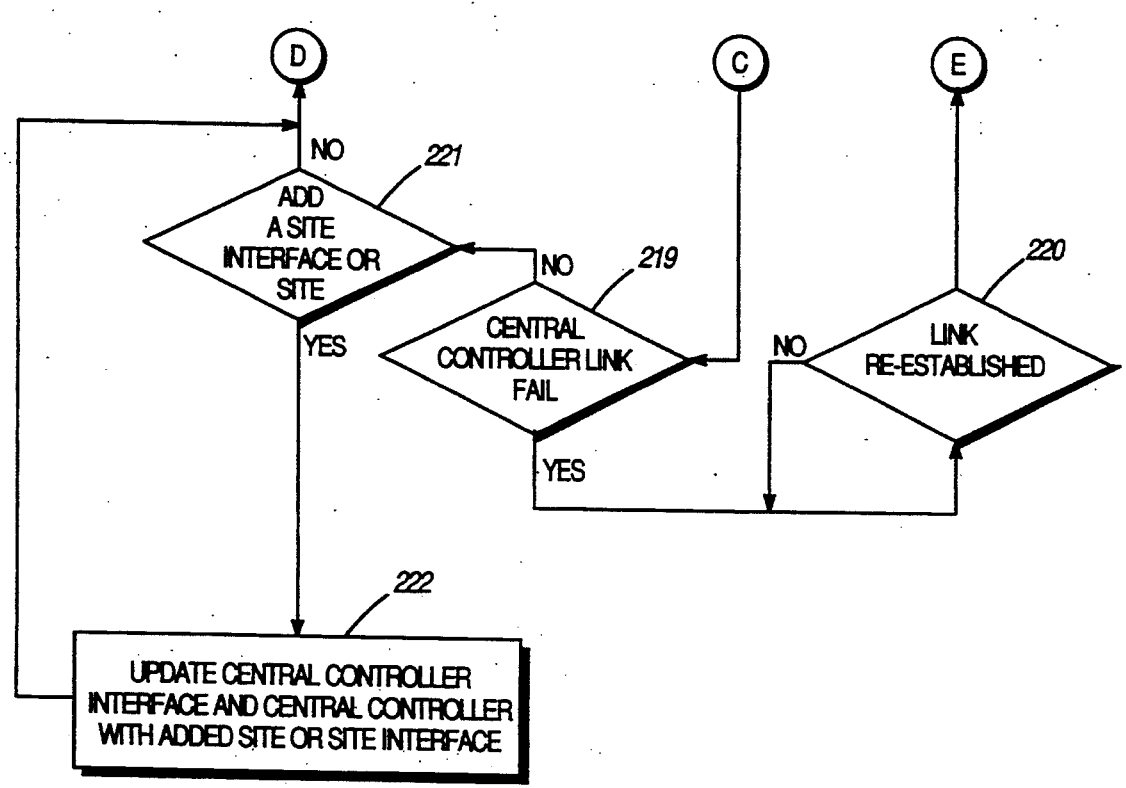

FIGS. 2-1, 2—2, and 2-3 illustrate a logic diagram that the central controller (101) may use to establish and maintain a database (111) of the multi-site communication system configuration information. At step 200, the central controller determines whether the central controller communication link has been established. The central controller communication link is considered established after a series of information exchanges have occurred. For example, a connection oriented mode of operation is established between the Central Controller and Central Controller Interface module using the 1984 International Telegraph and Telephone Consultative Committee (CCITT) X.25 Recommendation, data link access procedure (LAPB).

Once the central controller communication link is established (200), the central controller interface sends an address of the processing multiplexer to the central controller. Upon receiving the address, the central controller assigns the central controller link a link address and informs the central controller interface of the address (201). The address of the processing multiplexer comprises the first of three addresses that must be used in subsequent communications between the central controller and the central controller interface. The other addresses are the site link addresses for the links that couple the sites to site interfaces, and channel addresses (slot addresses). Both will be discussed below.

The three part address comprises a complete network address which the central controller and the central controller interface continually exchange on a periodic basis, for example every 2 seconds, to satisfy the link establishment procedure. With the link established, the central controller interface informs the site interfaces of the network address, which the site interfaces will use as the destination address when sending data packets to the Central Controller. Similarly, each of the site interfaces have an individual three part network address, wherein the first part consists of the address for the processing multiplexer, the second part consists of a default non-conflicting constant link address, and the third part consists of a slot address internally determined by switches or jumpers on the site interface itself.

After the central controller communication link has been assigned (201), a timer is initialized to measure a predetermined period of time (202). The predetermined time guarantees, on initial power up, that all of the site interfaces have relayed site interface configuration information to the central controller interface. The predetermined period of time is dependent on the size of the communication system network and may range from a few seconds to several minutes. Once the predetermined period of time expires (202), the central controller requests the site interface configuration information from the central controller interface (203). The site interface configuration information comprises the network address of each site interface, the status of the site links, and which sites are active.

Upon receiving the site interface configuration information, the central controller analyzes it to determine whether a site interface is connected to a site (204). A site interface is considered connected to a site when a known synchronization pattern is recognized by the site interface. In North America, a site communication link may be a T1 link, which is verified by looking for a predetermined pattern designated as the F-bit place holder in the digital stream. With the site link verified (204), the central controller determines, by accessing the database (111), the site type of the site linked to each site interface (205).

If the central controller determines that the site is of the second site type (a central electronics bank CEB) (206), the site interface and the central controller interface receive the link address of the site link that connects this site to a site interface from the site (207). The site link may be of a North American T1 or European E1 format where one of the channels has been designated as a signaling channel. This being the case, the site interface and the site establish a data connection which may be LAPB (see above). The central controller further requests, from the central controller interface, the link address of the site link and site configuration information. Upon receiving this information, the central controller stores it (208). Refer to U.S. Pat. No. 4,630,263 entitled Time Divison Multiplex Communication Control System, assigned to Motorola, Inc. for a description of the site configuration information of a second site type.

If the central controller has determined that the site of the first site type (206), the central controller determines whether this is a new link being established or a link being re-established (209). If the link is re-established (209), the central controller determines whether the link needs a new link address (210). A new link address will need to be generated if the link address has been lost from the associated site interface database. If the link does not need a new address (210), the process proceeds to step 213, discussed below.

If the new link needs an address, or the re-established link needs an address (210), the central controller assigns the link a link address (211). The central controller sends the link address and site type information (i.e. the site is of the first site type) to the central controller interface which stores the information (212). The central controller interface then sends both pieces of information to the designated site interface, which stores this information in its database. A similar procedure is followed for other site interfaces connected to a first site type.

Once the above mentioned information is stored (208 and 212), the site interface sends a data message to the central controller interface, which relays it to the central controller, indicating that it is ready to transceive audio information (213). Upon receiving this information, the central controller identifies the site interface as an active site interface, such that the site interface begins sourcing and processing digitized audio from the site to a shared bus in the processing multiplexer. The bus is shared in that another site interface is connected to the same site as a backup site interface. Refer to U.S. Pat. No. 5,175,727, assigned to Motorola, for a derailed description of how the site interface processes and sources digitized audio information.

As the site interfaces continue to process digitized audio, they each periodically transmit their link address to the other site interfaces and the central controller interface. Note that if a site interface is a backup interface, i.e. redundantly connected to to a site that is linked to an active site interface, the backup site still transmits the link address. This continues until a change in the system configuration information occurs. A change may result from a site failure, a site communication link failure, a site being added to the network, a site interface being added, or the central controller communication link fails.

If the system configuration information changed as a result of a site failure (214), the central controller interface generates site failure information (215) and sends it to the central controller, wherein the site failure information indicates the site that failed as specified by the link address. A site fails when all site links are considered down (no synchronization between the site and the active site interface and the backup site interface) or a site link has not been assigned a link address.

If the system configuration information changed as a result of a site link failure (216), such that the active site interface and the site can no longer maintain synchronization, the active site interface generates link failure information and sends it to the central controller interface (217). The link failure information indicates, to the other site interfaces and the central controller interface, that the link is down. If there is a backup site interface, it will become active and send this information to the central controller interface, such that the site is still coupled to the network. When the link is re-established (218), the process continues at step 205. Note that the central controller interface sends the above mentioned information to the central controller which stores it in its database.

If the system configuration information has changed due to the central controller communication link failing (219), the network is down until the link is re-established (220). Once the link is re-established, the process proceeds to step 200. If, however, the change occurred as a result of a site or a site interface being added to the Processing Multiplexer (221), the central controller interface updates the central controller with the new information (222). Having done this, the process will continue as prescribed at step 214.

The present invention provides for the central controller to obtain resource information about the processing multiplexer's site interfaces, the site links, the resources available, and the site types, i.e. system configuration information. With such information, a Multi-Site Communication System, such as that described in U.S. Pat. No. 5,175,727 "A Communications System Network" is able to perform digital audio cross-connects in a one to many fashion.

We claim:

1. In a multi-site communication system that includes a plurality of sites, a central controller, and a processing multiplexer, wherein the processing multiplexer includes a central controller interface and a plurality of site interfaces, a method for the central controller to establish and maintain system configuration information, the method comprises the steps of:

a) establishing, by both the central controller and the central controller interface, a central controller communication link between the central controller and the central controller interface;

b) when the central controller communication link between the central controller and the central controller interface is established, assigning, by the central controller, the central controller communication link a link address and initializing, by the central controller, a predetermined period of time;

c) after the predetermined period of time elapses, requesting, by the central controller, site interface configuration information from the central controller interface, wherein the site interface configuration information includes an indication of site interfaces of the plurality of sites interfaces that are active to produce active site interfaces;

d) when a site communication link is established between one of the active site interfaces and a site of the plurality of sites, determining, by the central controller, site type of the site;

e) when the site type of the site is a first site type, assigning, by the central controller, a first unique link address to the site communication link between the active site interface and the site to produce said first unique link address; and f) storing, by the central controller in a database, the site type of the site, the first site type link address of the site communication link, and the link address of the central controller communication link.

2. The method of claim 1 further comprises the steps of:

g) when a site communication link between a site of the plurality of sites and one of the active site interfaces fails, receiving, by the central controller, site communication link failure information from the one of the active site interfaces via the central controller interface; and h) storing, by the central controller, the site communication link failure information in the database.

3. The method of claim 1 further comprises the steps of:

g) when a site interface is added to the processing multiplexer, receiving, by the central controller, new site interface information from the new site interface, via the central controller interface;

h) when a site communication link is established between the new site interface and a new site of the plurality of sites, determining, by the central controller, the site type of the new site;

i) when the site type of the new site is said first site type, assigning, by the central controller, said first unique link address to the site communication link between the new site interface and the new site; and j) storing, by the central controller, the site type of the new site and the unique link address of the site communication link between the new site interface and the new site in the database.

4. The method of claim 1 further comprises the steps of:

g) when an active site interface fails, receiving, by the central controller, site interface failure information from the central controller interface; and h) storing, by the central controller, the site interface failure information in the database.

5. The method of claim 1 further comprises the steps of:

g) when the site type of the site is a second site type, receiving, by the central controller, site type information from the site via the site interface and the central controller interface, wherein the site type information includes identification of system features available at the site and a second unique link address; and h) storing, by the central controller, the site type and the site type information of the site in the database.

6. The method of claim 1 further comprises the steps of:

g) when a new site of the plurality of sites is connected to more than one active site interface by site interface communication links, determining, by the central controller, the site type of the new site;

h) when the site type of the new site is a first site type, assigning, by the central controller, one unique link address to the site communication links;

i) when the site type of the new site is a second site type, receiving, by the central controller, site type information and one unique link address for the site communication links; and j) storing, by the central controller, the site type of the new site, the one unique link address for the site communication links and, when the new site is that of a second site type, the site type information in the database.

7. In a multi-site communication system that includes a plurality of sites, a central controller, and a processing multiplexer, wherein the processing multiplexer includes a central controller interface and a plurality of site interfaces, a method for the central controller to re-establish system configuration information upon re-activation of a central controller communication link between the central controller and the central controller interface after a failure of the central controller communication link, the method comprises the steps of:

a) re-establishing, by both the central controller and the central controller interface, the central controller communication link between the central controller and the central controller interface;

b) when the central controller communication link is re-established, assigning, by the central controller, the central controller communication link a link address and initializing, by the central controller, a predetermined period of time;

c) after the predetermined period of time elapses, requesting, by the central controller, site interface configuration information from the central controller interface, wherein the site interface configuration information includes an indication of site interfaces of the plurality of sites interfaces that are active to produce active site interfaces;

d) when a site communication link is established between one of the active site interfaces and a site of the plurality of sites, determining, by the central controller, site type of the site;

e) when the site type of the site is a first site type, assigning, by the central controller, a first unique link address to the site communication link between the active site interface and the site to produce said first unique link address; and f) when the site type of the site is a second site type, receiving, by the central controller, site type information from the site via the site interface and the central controller interface, wherein the site type information includes identification of system features available at the site and a second unique link address; and g) storing, by the central controller in a database, the site type of the site, the link address of the central controller communication link, the first unique link address when the site is of the first site type, and the site type information and the second unique link address when the site is of the second type.

8. In a multi-site communication system that includes a plurality of sites, a central controller, and a processing multiplexer, wherein the processing multiplexer includes a central controller interface and a plurality of site interfaces, a method for the central controller interface to assist the central controller in establishing and maintaining system configuration information, the method comprises the steps of:

a) when a central controller communication link between the central controller and the central controller interface is established, receiving, by the central controller interface, a request for site interface configuration information from the central controller, wherein the site interface configuration information includes an indication of site interfaces of the plurality of sites that are active to produce active site interfaces;

b) when a site communication line between one of the active site interfaces and a site of the plurality of sites is established, transmitting, by the central controller interface, site type of the site to the central controller;

c) when the site type of the site is a first site type, receiving, by the central controller interface, a first unique link address of the site communication link;

d) storing, by the central controller interface, said first unique link address in memory of the central controller interface; and e) transmitting, by the central controller interface, said first unique link address to the site interface such that the site interfaces stores said first unique link address.

9. The method of claim 8 further comprises the steps of:

f) when a site communication link between a site of the plurality of sites and the one of the active site interfaces fails, transmitting, by the central controller interface, site communication link failure information to the central controller; and g) storing, by the central controller interface, the site communication link failure information in the memory of the central controller interface.

10. The method of claim 8 further comprises the steps of:

f) when a site interface is added to the processing multiplexer, transmitting, by the central controller interface, new site interface information to the central controller;

g) when a site communication link is established between the new site interface and a new site of the plurality of sites and the new site is that of said first site type, receiving, by the central controller interface, said first unique link address for the site communication link between the new site interface and the new site; and h) storing, by the central controller interface, said first unique link address for the site communication link between the new site interface and the new site in the memory of the central controller interface.

11. The method of claim 8 further comprises the steps of:

f) when an active site interface fails, transmitting, by the central controller interface, site interface failure information to the central controller.

12. The method of claim 8 further comprises the steps of:

f) when the site type of the site is a second site type, relaying, by the new site interface, site type information from the site to the central controller interface, wherein the site type information includes identification of system features available at the site and a second unique link address; and g) storing, by the central controller interface, the site type information of the site and the second unique link address in memory of the central controller interface.

* * * * *